United States Patent Office 3,355,446
Patented Nov. 28, 1967

3,355,446
SELECTED 2 - ARYLIMINO - 4 - HEXAFLUOROISO-PROPYLIDENE-1,3-DITHIETANES AND THEIR PREPARATION
Maynard S. Raasch, Fairfax, Del., assignor to E. I. du Pont de Nemours and Company, Wilmington, Del., a corporation of Delaware
No Drawing. Filed Sept. 28, 1964, Ser. No. 399,880
12 Claims. (Cl. 260—152)

ABSTRACT OF THE DISCLOSURE

Claimed are certain 2 - arylimino - 4 - hexafluoroisopropylidene - 1,3 - dithietanes, e.g., 2 - (phenylimino) - 4 - [2,2,2 - trifluoro - 1 - (trifluoromethyl)ethylidene]- 1,3 - dithietane and 2 - (p - phenylazophenylimino) - 4- [2,2,2 - trifluoro - 1 - (trifluoromethyl)ethylidene] - 1,3- dithietane, useful as textile-treating agents such as antistatic agents for wool. They may be prepared by reacting, at a temperature in the range of 20 to 150° C., bis(trifluoromethyl)-thioketene with an appropriate aryl isothiocyanate, e.g., phenyl isothiocyanate and p-phenylazophenyl isothiocyanate.

FIELD OF THE INVENTION

This invention relates to, and has as its principal objects provision of, novel fluorinated 1,3-dithietanes and a preparation of the same.

DESCRIPTION OF THE INVENTION

The new products of this invention are 2-arylimino-4-hexafluoroisopropylidene - 1,3 - dithietanes of the general formula

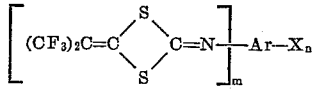

where $m$ is a whole number from 1 to 2; Ar is 1- to 3-ring arylene; X is halogen, lower alkyl, lower hydrocarbyloxy in which any unsaturation is ethlyenic, 1- to 6-carbon carbacyl, phenylazo, nitro or lower carbalkoxy; and $n$ is a whole number from 0 to 3.

These products are prepared by reacting, at a temperature in the range of 20 to 150° C., bis(trifluoromethyl) thioketene with an aryl isothiocyanate of the formula

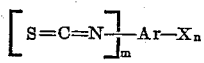

where $m$, Ar, X and $n$ have the previously stated significance. The reaction is represented by the equation:

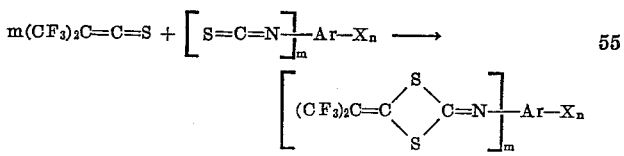

In naming the compounds of this invention, the fluorinated group in the 4-position of the 1,3-dithietane can be called 2,2,2 - trifluoro - 1 - (trifluoromethyl)ethylidene, according to accepted rules. A shorter, definite but unofficial name for this group is hexafluoroisopropylidene. Both nomenclatures are used in this discussion.

One of the starting materials used in the process of this invention, bis(trifluoromethyl)thioketene, is a new compound described and claimed in my U.S. Patent 3,275,609. Detailed procedure for preparing the compound is given in the patent.

The other reactant is an aryl or substituted-aryl isothiocyanate. These are well-known compounds prepared by standard methods.

The reaction between bis-(trifluoromethyl)thioketene and the aryl isothiocyanate proceeds at relatively low temperature, of the order of 20° C. More practical reaction rates are obtained at somewhat higher temperatures, of the order of 50° C. However, there is no advantage in exceeding about 150° C., and the preferred range of temperature is that between 50 and 110° C. Within this range, substantial conversions are obtained in a short time, e.g., 1–2 hours, and it is generally unnecessary to prolong the reaction time beyond about 20 hours. Since bis(trifluoromethyl)thioketene boils at 53° C., operation above this temperature is best carried out in a closed vessel under the autogenous pressure developed by the reaction components. However, it is also possible to pass the reactants at or near atmospheric pressure through a reaction zone, such as a tube, heated to the desired temperature.

The reaction may be carried out in the absence of a solvent. When the isothiocyanate reactant is a solid, it is convenient to use a nonreactive solvent such as a hydrocarbon or halogenated hydrocarbon. Examples of suitable solvents are n-hexane, cyclohexane, benzene, toluene, dichloromethane, carbon tetrachloride, dichlorotetrafluoroethane, 1,1,2 - trichloro - 1,2,2 - trifluoroethane, chlorobenzene, and the like.

The relative proportions of the two reactants are not critical, as the reaction will proceed regardless of what they are. As a matter of convenience, approximately equimolar amounts are normally used, i.e., one mole of bis(trifluoromethyl)thioketene for each isothiocyanate group present in the aryl isothiocyanate, but an excess of one or the other reactant, particularly bis(trifluoromethyl) thioketene, can be employed.

Occasionally, minor amounts of the bis(trifluoromethyl)thioketene may dimerize or polymerize under the operating conditions. If present, these by-products can be readily removed. The dimer can be sublimed out under reduced pressure, and the polymer, which is insoluble in most organic solvents, can be separated by solvent extraction. The dithietane reaction products are solids which can be purified, if necessary, by crystallization from an appropriate solvent.

EMBODIMENTS OF THE INVENTION

There follow some nonlimiting examples which illustrate the invention in more detail.

EXAMPLE 1

*2-(phenylimino)-4-[2,2,2-trifluoro-1-(trifluoromethyl) ethylidene]-1,3-dithietane*

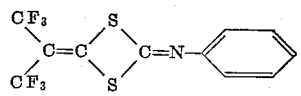

Equimolar quantities of phenyl isothiocyanate and bis-(trifluoromethyl)thioketene were heated at 100 °C. in a sealed glass vessel for 15 hours. On cooling to room temperature, the product crystallized. It was filtered from liquid present and recrystallized from methanol to give a 49% yield of the white dithietane, M.P. 46–47° C.

*Analysis.*—Calc'd for $C_{11}H_5F_6NS_2$: C, 40.16; H, 1.53; S, 19.50. Found: C, 40.10; H, 1.66; S, 19.46.

In confirmation of the structure, the $F^{19}$ nuclear magnetic resonance spectrum shows a singlet, which indicates the two $CF_3$ groups are equivalent, and the infrared spectrum has a band at 6.15μ assigned to the exocyclic C=C bond.

EXAMPLE 2

*2-(p-chlorophenylimino)-4-[2,2,2-trifluoro-1-(trifluoromethyl)ethylidene]-1,3-dithietane*

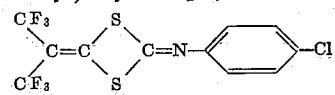

Equimolar amounts of p-chlorophenyl isothiocyanate and bis(trifluoromethyl)thioketene, together with 100 ml. of dichloromethane per gram-mole, were heated at 100° C. in a sealed glass reactor for 4 hours. The solvent was removed from the cooled product which was then recrystallized from methanol to give a 54% yield of the white dithietane, M.P. 48.5–49° C.

*Analysis.*—Calc'd for $C_{11}H_4ClF_6NS_2$: C, 36.32; H, 1.11; S, 17.64. Found: C, 36.39; H, 1.40; S, 17.54.

The $F^{19}$ nuclear magnetic resonance spectrum consists of a singlet.

EXAMPLE 3

*2-(3,4,5-trimethoxyphenylimino)-4-[2,2,2-trifluoro-1-(trifluoromethyl)ethylidene]-1,3-dithietane*

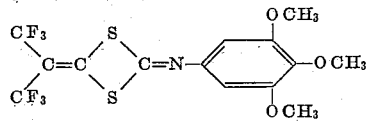

3,4,5-trimethoxyphenyl isothiocyanate (1 mole) and bis-(trifluoromethyl) thioketene (3 moles) were sealed in a glass vessel and heated at 100° C. for 16 hours. The cooled product was stirred with dichloromethane and filtered to remove polymer. The filtrate was evaporated and the residue was recrystallized from hexane to give a 73% yield of the white dithietane, M.P. 89.7–90.5° C.

*Analysis.*—Calc'd for $C_{14}H_{11}F_2NO_3S_2$: C, 40.10; H, 2.64; S, 15.29. Found: C, 40.84; H, 2.76; S, 15.33.

The $F^{19}$ nuclear magnetic resonance spectrum consists of a singlet.

The 3,4,5-trimethoxyphenyl isothiocyanate was made by adding 3,4,5-trimethoxyaniline to a stirred, aqueous suspension of thiophosgene. After recrystallization from hexane, the product melted at 66° C.

EXAMPLE 4

*2-(p-phenylazophenylimino)-4-[2,2,2-trifluoro-1-(trifluoromethyl)ethylidene]-1,3-dithietane*

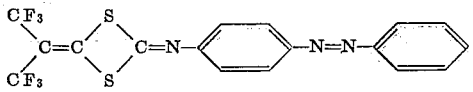

Equimolar amounts of p-phenylazophenyl isothiocyanate (Bolser and Hartshorn, J. Am. Chem. Soc., 45, 2349 (1923)) and bis(trifluoromethyl)thioketene, together with four moles of dichloromethane as solvent, were heated in a sealed glass vessel at 100° C. for 16 hours. The isothiocyanate was not completely used up because part of the thioketene had been converted to its dimer. The solvent was allowed to evaporate and the dimer was sublimed off. The residue was then heated with another molar quantity of bis(trifluoromethyl)thioketene for 16 hours. Dimer of the thioketene was sublimed out under vacuum at 100° C. and the product remaining was recrystallized from ethanol; yield, 71%, M.P. 118–119° C., orange crystals.

*Analysis.*—Calc'd for $C_{17}H_9F_6N_3S_2$: C, 47.11; H, 2.09; S, 14.80. Found: C, 47.01; H, 1.82; S, 14.92.

The $F^{19}$ nuclear magnetic resonance spectrum consists of a singlet.

EXAMPLE 5

*2-(1-naphthylimino)-4-[2,2,2-trifluoro-1-(trifluoromethyl)ethylidene]-1,3-dithietane*

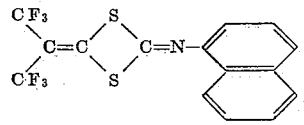

Equimolar amounts of 1-naphthyl isothiocyanate and bis(trifluoromethyl)thioketene were heated at 100° C. in a sealed glass vessel for 15 hours. The product was recrystallized from dichloromethane-ethanol to give a 79% yield of the white dithietane, M.P. 128.5–128.7° C.

*Analysis.*—Calc'd for $C_{15}H_7F_6NS_2$: C, 47.49; H, 1.86; S, 16.91. Found: C, 47.22; H, 1.69; S, 17.32.

The $F^{19}$ nuclear magnetic resonance spectrum consists of a singlet.

The foregoing detailed examples illustrate the preparation of specific products of this invention. Application of the described procedure to other aryl isothiocyanates yields in a similar manner other 2-arylimino-4-hexafluoroisopropylidene-1,3-dithietanes of the structure defined in the general formula previously set forth. Additional examples of specific products of this invention are given in the table below. The first column lists by name the aryl isothiocyanate (mono-or diisothiocyanate) reacted with the bis(trifluoromethyl)thioketene. Opposite each name, the second column shows the formula of the —Ar—$X_n$ group present in the resulting dithietane of general formula

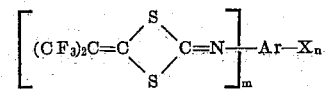

The number $m$ will always be 1 except when the reactant in the first column is a diisothiocyanate, in which case $m$ is 2.

TABLE

| Isothiocyanate | Ar-$X_n$ in Reaction Product |
|---|---|
| o-Tolyl | CH₃–⌬– |
| p-Butylphenyl | $C_4H_9$–⌬– |
| p-n-Heptylphenyl | $C_7H_{15}$–⌬– |
| 2-phenylphenyl | ⌬–⌬– |
| 2,4-dimethylphenyl | CH₃–⌬(CH₃)– |
| 2-anthryl | ⌬⌬⌬– |
| m-Propoxyphenyl | $OC_3H_7$–⌬– |
| p-Butoxyphenyl | $C_4H_9O$–⌬– |
| p-Allyloxyphenyl | $CH_2=CH-CH_2O$–⌬– |
| p-Phenoxyphenyl | $C_6H_5O$–⌬– |
| p-Acetylphenyl | $CH_3CO$–⌬– |
| p-Benzoylphenyl | $C_6H_5CO$–⌬– |

TABLE—Continued

| Isothiocyanate | Ar-X$_n$ in Reaction Product |
|---|---|
| p-Fluorophenyl | F—⟨⟩— |
| 2,4-dibromophenyl | Br—⟨⟩— (Br) |
| 3,4-dichlorophenyl | Cl—⟨⟩— (Cl) |
| 3-bromo-p-tolyl | CH$_3$—⟨⟩— (Br) |
| 3-nitro-o-tolyl | ⟨⟩— (NO$_2$, CH$_3$) |
| 4-fluoro-3-nitrophenyl | F—⟨⟩— (NO$_2$) |
| 4-carbomethoxyphenyl | CH$_3$OCO—⟨⟩— |
| 3-carbethoxyphenyl | ⟨⟩— (COOC$_2$H$_5$) |
| 4-carbobutoxyphenyl | C$_4$H$_9$OCO—⟨⟩— |
| p-Phenylenediisothiocyanate | —⟨⟩— (m=2) |
| 2,4-tolylenediisothiocyanate | ⟨⟩—CH$_3$ (m=2) |

The compounds of the present invention are useful as textile-treating agents, such as antistatic agents for wool. Strips of wool fabric were dipped in 1% solutions in dichloromethane of the compounds of each of the examples and dried. The strips were next laid on a glass surface and stroked with a plastic rod in a standard manner. The strips were then held in a vertical position and the attraction, or lack thereof, to the glass rod was noted. The attraction of the treated strips to the rod was greatly reduced or nearly eliminated compared to an untreated control strip which was strongly attracted. This shows that much less static change was built up on the treated strips.

Since obvious modifications and equivalents in the invention will be evident to those skilled in the chemical arts, I propose to be bound solely by the appended claims.

The embodiments of the invention in which an exclusive property or privilege is claimed are defined as follows.

I claim:

1. A compound of the formula

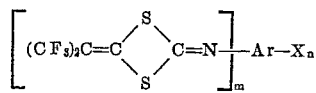

wherein $m$ is a whole number from 1 to 2;

Ar is 1- to 3-ring arylene;

X is selected from the group consisting of halogen, lower alkyl, lower hydrocarbyloxy, in which any unsaturation is ethylenic, 1- to 6-carbon carbacyl, phenylazo, nitro and lower carbalkoxy; and $n$ is a whole number from 0 to 3.

2. 2 - (phenylimino) - 4 - [2,2,2-trifluoro-1-(trifluoromethyl)ethylidene]-1,3-dithietane.

3. 2 - (p-chlorophenylimino) - 4 - [2,2,2-trifluoro-1-(trifluoromethyl)ethylidene]-1,3-dithietane.

4. 2 - (3,4,5 - trimethoxyphenylimino) - 4-[2,2,2-trifluoro-1-(trifluoromethyl)ethylidene]-1,3-dithietane.

5. 2 - (p - phenylazophenylimino)-4-[2,2,2-trifluoro-1-(trifluoromethyl)ethylidene]-1,3-dithietane.

6. 2 - (1 - naphthylimino) - 4 - [2,2,2-trifluoro-1-(trifluoromethyl)ethylidene]-1,3-dithietane.

7. The process which comprises reacting, at a temperature in the range of 20 to 150° C., bis(trifluoromethyl)-thioketene with an aryl isothiocyanate of the formula

wherein $m$ is a whole number from 1 to 2;

Ar is 1- to 3-ring arylene;

X is selected from the group consisting of halogen, lower alkyl, lower hydrocarbyloxy, in which any unsaturation is ethylenic, 1- to 6-carbon carbacyl, phenylazo, nitro and lower carbalkoxy; and $n$ is a whole number from 0 to 3.

8. The process which comprises reacting, at a temperature in the range of 20 to 150° C., bis(trifluoromethyl)-thioketene with phenyl isothiocyanate.

9. The process which comprises reacting, at a temperature in the range of 20 to 150° C., bis(trifluoromethyl)-thioketene with p-chlorophenyl isothiocyanate.

10. The process which comprises reacting, at a temperature in the range of 20 to 150° C., bis(trifluoromethyl)-thioketene with 3,4,5-trimethoxyphenyl isothiocyanate.

11. The process which comprises reacting, at a temperature in the range of 20 to 150° C., bis(trifluoromethyl)-thioketene with p-phenylazophenyl isothiocyanate.

12. The process which comprises reacting, at a temperature in the range of 20 to 150° C., bis(trifluoromethyl)-thioketene with 1-naphthyl isothiocyanate.

No references cited.

WALTER A. MODANCE, *Primary Examiner.*

JAMES A. PATTEN, *Examiner.*